United States Patent [19]
Wössner et al.

[11] Patent Number: 4,561,164
[45] Date of Patent: Dec. 31, 1985

[54] METHOD OF MAKING PISTON ROD FOR SHOCK ABSORBERS

[75] Inventors: Felix Wössner, Schweinfurt; Hermann Itzinger, Dittelbrunn; Leopold Schöpplein, Schweinfurt, all of Fed. Rep. of Germany

[73] Assignee: Fichtel & Sachs AG, Schweinfurt, Fed. Rep. of Germany

[21] Appl. No.: 577,315

[22] Filed: Feb. 6, 1984

Related U.S. Application Data

[63] Continuation of Ser. No. 313,676, Oct. 21, 1981, abandoned.

[30] Foreign Application Priority Data

Oct. 29, 1980 [DE] Fed. Rep. of Germany ....... 3040652

[51] Int. Cl.⁴ ..................... B21D 39/00; B23P 11/00
[52] U.S. Cl. ........................................ 29/510; 29/517; 74/579 R; 188/322.22
[58] Field of Search ................ 29/156.5 A, 517, 510, 29/520, DIG. 34; 74/579 R, 587, 588; 188/312, 322.22, 322.17, 300, 376

[56] References Cited

U.S. PATENT DOCUMENTS

| | | | |
|---|---|---|---|
| 1,169,642 | 1/1916 | Heeter et al. | 29/517 X |
| 1,365,030 | 1/1921 | Flentje | 188/322.17 |
| 1,383,002 | 6/1921 | McDlvried | 29/156.5 A X |
| 1,670,532 | 5/1928 | Crawford | 74/579 X |
| 1,823,158 | 9/1931 | Mogford et al. | 29/517 UX |
| 2,329,770 | 9/1943 | Knox | 29/517 X |
| 2,665,818 | 1/1954 | Borges et al. | 29/DIG. 34 X |
| 2,825,855 | 3/1958 | Frekko | 29/517 UX |
| 2,995,057 | 8/1961 | Nenzell | 29/DIG. 34 X |
| 3,034,488 | 5/1962 | Reiners | 74/579 X |
| 3,158,232 | 11/1964 | Doetsch et al. | 188/312 X |
| 3,279,052 | 10/1966 | Laverty | 29/516 |
| 3,605,553 | 9/1971 | Panigati | 188/322.22 X |
| 3,722,076 | 3/1973 | Dent | 29/517 |
| 3,952,395 | 4/1976 | Crossman et al. | 29/520 X |
| 3,995,842 | 12/1976 | Freitag | 188/176 |
| 4,311,302 | 1/1982 | Heyer et al. | 188/322.22 X |

FOREIGN PATENT DOCUMENTS

| | | |
|---|---|---|
| 1270522 | 6/1968 | Fed. Rep. of Germany . |
| 2248374 | 11/1973 | Fed. Rep. of Germany . |
| 2757232 | 7/1978 | Fed. Rep. of Germany . |
| 1067391 | 6/1954 | France . |
| 996356 | 6/1965 | United Kingdom . |

Primary Examiner—Charlie T. Moon
Attorney, Agent, or Firm—Toren, McGeady, Stanger, Goldberg & Kiel

[57] ABSTRACT

A piston rod particularly for shock absorbers and spring devices has been shown in the illustrative embodiments. The piston rod comprises a tubular member which tubular member is provided with at least one extension of reduced diameter. The extension is intended for being fastened to associated structural members. In view of fluid-tightly closing the interior of the piston rods on at least one of their ends, a closure member is provided within the cavity defined by the extension of reduced diameter. The closure member is fastened to the piston rod by the reduction of the diameter of the piston rod.

9 Claims, 10 Drawing Figures

METHOD OF MAKING PISTON ROD FOR SHOCK ABSORBERS

This is a continuation of application Ser. No. 313,676, filed Oct. 21, 1981, now abandoned.

BACKGROUND

1. Field of the Invention

This invention relates to tubular piston rods particularly for shock absorbers and spring devices of motor vehicles. A new structure of the piston rod and a new method for manufacturing such a piston rod are proposed. The new structure warrants a tight closure of the tubular piston rod on at least one end thereof and a rigid connection with other structural members to be connected with the piston rod. The new method is more economic than known methods for manufacturing such piston rods.

2. The Prior Art

According to German Utility Pat. No. 7 930 294 a tubular piston rod is proposed in which an extension of reduced diameter at a respective end is made by cold shaping or warm shaping. The extension of reduced diameter is intended to be connected to another structural member, e.g. a link member, by which a connection with the body of a motor vehicle is obtained. For improving the rigidity of such a tubular piston rod it is further known to fill the interior of the tube member with molten light metal. This has, however, the result that the weight of the piston rod is increased and the price of the piston rod becomes higher due to the increased manufacturing costs. If the piston rod is not filled with light metal, a further manufacturing step is necessary for closing at least one end of the piston rod in order to prevent escaping of the hydraulic of pneumatic damping fluid through the piston rod. In case of light-metal-filled piston rods, the interior of the piston rods can't be used as an additional working or compensation chamber.

SUMMARY

This invention relates to a piston rod particularly for shock absorbers and spring devices of motor vehicles, comprising a tubular member which tubular member is provided with at least one extension being intended for being fastened to an associated structural member.

It is an object of the present invention to avoid disadvantages of the known construction and to provide a piston rod of simple design and low manufacturing costs, the interior of which can be closed in a gas-tight manner by a simple manufacturing step.

In view of this object, a closure member is provided within said extension of reduced diameter, said closure member being fastened to said piston rod by shaping said extension of reduced diameter.

According to this invention, the closure member is inserted into the respective end of the piston rod and thereupon the extension of reduced diameter is shaped by reducing a terminal section of said piston rod member. As a result thereof, the interior of the piston rod is closed in a gas-tight manner at the respective end without an additional manufacturing step. Therefore, the piston rod is of simple design and the manufacturing costs are low. It is to be noted that up to now it was not possible to reduce the interior diameter of the tube in the terminal section to zero and to provide thereby a gas-tight closure at the respective end of the piston rod.

It is further to be noted that with shock absorbers, the closure must be gas-tight up to gas pressure of at least 60 bar.

According to a further feature of this invention, the closure member is a cylindrical pin which extends over about the length of the extension of reduced diameter. By such a cylindrical closure member the interior surface of the extension of reduced diameter is smoothed and hardened; in absence of such a closure member, the interior surface of the extension of reduced diameter would become rough, non-circular and fissured. By smoothing and hardening the surface according to this invention, fissuration is avoided so that the extension of reduced diameter can be loaded to a higher extent. Due to the fact that the closure member is in contact with the interior surface of the section of reduced diameter along about the total extent of said section, an extremely tight closure of the interior of the piston rod is achieved without any subsequent manufacturing step.

According to a further feature of this invention, the cylindrical pin is thickened at the inner end thereof. The thickened part can be shaped as a conical pin head. This modification is particularly useful for piston rods which are subject to extremely high pressures; moreover, in the thickened section, additional sealing means can be provided.

Closure members of simple design can be used. According to a modification of this invention, the closure member can be a closure ball.

The closure member can be a metallic member, preferably a steel member. If, however, the configuration of the extension of reduced diameter is achieved by cold shaping, particularly by hammering, it is also possible to use a closure member of plastic material. It is further proposed that the closure member is provided with a sealing agent on its surface. Liquid and pasty sealing agent may be used. It is, however, also possible to provide said closure member with a usual sealing member.

The invention further relates to a method for manufacturing a piston rod comprising
  (a) providing a tubular member;
  (b) reducing at least one end section of said tubular member in cross-section and
  (c) inserting a closure member into the cavity defined by said end section before said reduction in cross-section is completed, such as to fix said closure member within said end section and to tightly close said cavity in said end section.

BRIEF DESCRIPTION OF THE DRAWINGS

For a better understanding of the invention, reference may be made of the following detailed description of exemplary embodiments, in which.

Figure 1:
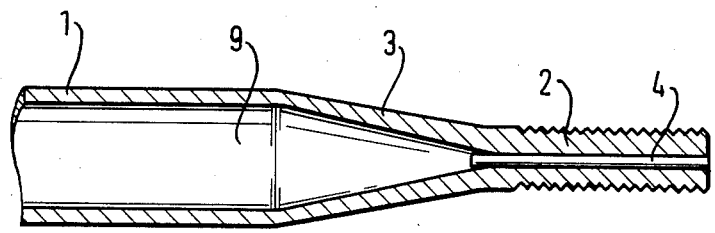
FIG. 1 shows a tubular member with an extension of reduced diameter, a cylindrical pin being inserted into said extension.

In the drawings there is shown only one end of the respective piston rod. The respective other end may also be provided with a closure member. In case of said other end being an inwardly directed end with respect to an associated cylinder, this other end may also remain open. The shaping of the extension of reduced diameter can be made by hammering, in which case the closure member, in particular the cylindrical pin 4 may be inserted before the hammering operation. This cylindrical pin extends along the total length of the extension of reduced diameter. By the hammering operation the interior surface of the extension 2 is brought into intimate contact with the cylindrical pin 4, so that the interior 9 of the piston rod is perfectly sealed with respect to pressurized gas. Due to the cylindrical external face of the pin, the interior surface does not become fissured in spite of the considerable deforming to which the extension is subjected to. Furthermore, the interior surface of the extension does not become rough or noncircular. This interior surface is rather smoothed and hardened by the pin. Moreover, the cylindrical pin 4 acts as a supporting insert, so that the extension can be subjected to increased load. This is particular true if said cylindrical pin is a metal pin, preferably a steel pin.

If the extension of reduced diameter is, however, made by cold shaping, it is also possible to use a plastic-made cylindrical pin 4. Independently of said cylindrical pin being made of metal or of plastic material, these pins perfectly fulfil the function of sealing the interior 9 without any further working step.

Figure 2:
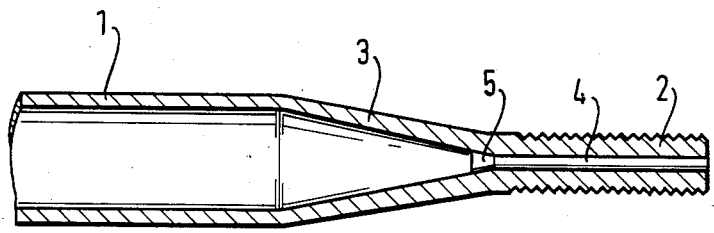
FIG. 2 shows an embodiment similar to the embodiment of FIG. 1, in which said cylindrical pin is provided with a conical pin head at its inwardly directed end.

The embodiment of FIG. 2 differs from the embodiment of FIG. 1 by a different configuration of the cylindrical pin 4 inserted into the extension 2 of reduced diameter, said cylindrical pin 4 being provided with a conical head 5. This conical head 5 is particularly adapted for receiving an additional sealing member between its external surface and the internal surface of the transition area 3.

Figure 3:
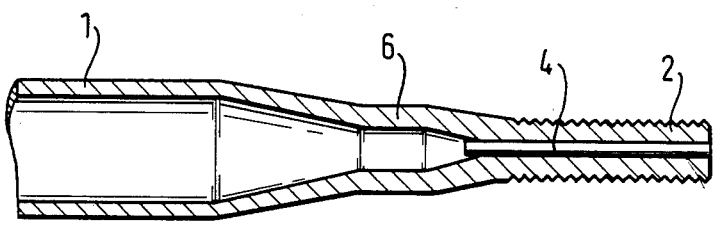
FIG. 3 shows an embodiment in which the reduction in diameter of the extension is stepwise.
Figure 4:
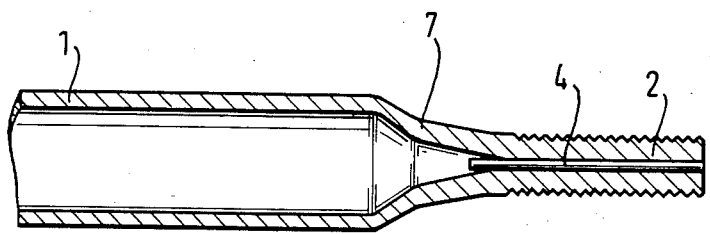
FIG. 4 shows a piston rod in which the transition from the full diameter to the reduced diameter section is relatively short.

When the extension 2 of reduced diameter is made from an end section of the tube member 1, e.g. by hammering, a stepwise transition 6 may be provided as seen in FIG. 3 or a shortened transition 7 as shown in FIG. 4. Also in these embodiments the cylindrical pin 4 provides a gas-tight sealing.

Figure 5:
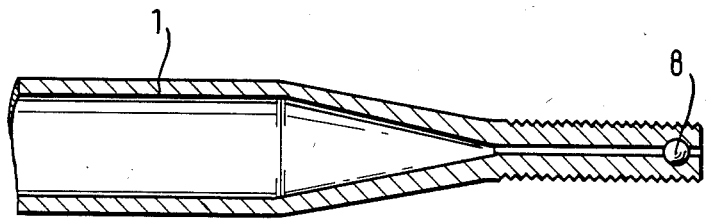
FIG. 5 shows a tubular piston rod, the closure member of which is defined by a closure ball.

In FIG. 5 a ball-shaped closure member 8 is inserted before the extension 2 of reduced diameter is shaped and this ball-shaped member 8 is fastened during the subsequent shaping step. As can be seen from all embodiments, closure members of simple configuration can be used for achieving a gas-tight closure of the interior 9. According to the material of the closure member it may be useful to provide this closure member with a liquid or pasty sealing agent before insertion or to provide a sealing member on said closure member.

Figure 6:
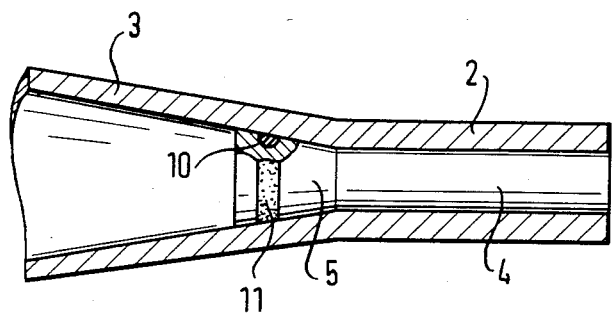
FIG. 6 shows an enlarged detail of FIG. 2.

In FIG. 6 one can see the thickened conical head 5 of the cylindrical pin 4 as being provided with an annular groove 10. An annular sealing member 11 is inserted into the annular groove 10. The annular sealing member 11 is in sealing contact with the interior surface of the transitional conical section 3.

Figure 7:
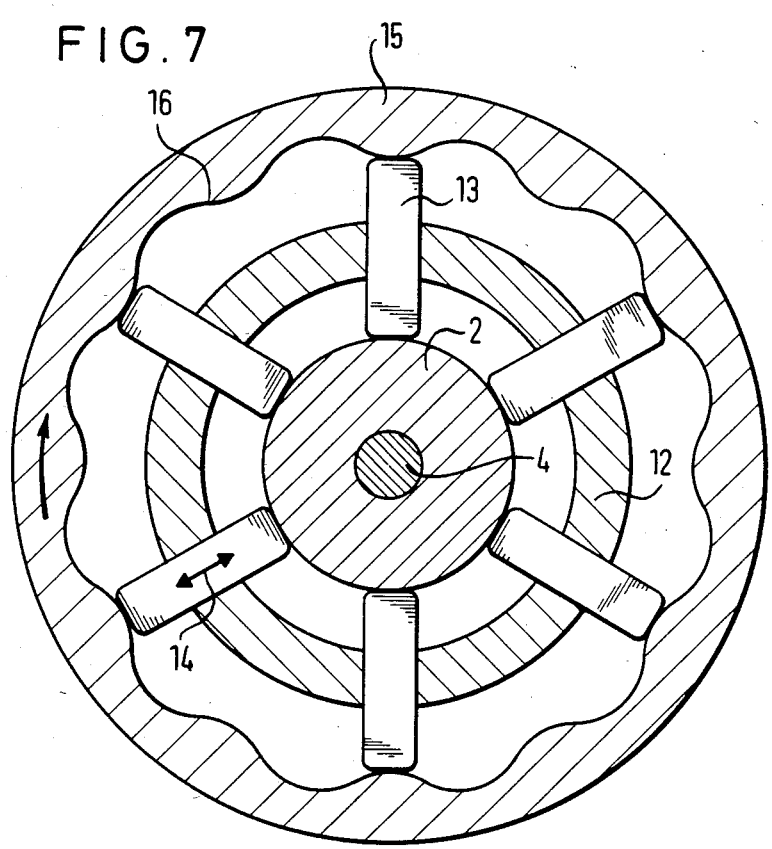
FIG. 7 shows a hammering tool for reducing the cross section of the tubular member.

In FIG. 7 there is shown a hammering device for reducing the tubular member in cross section so as to achieve the end section of reduced diameter including the terminal section 2 of substantially constant diameter. The hammering tool comprises a stationary ring member 12 in which hammers 13 are radially guided. The hammers 13 are moved in radial direction as indicated by the arrow 14 by driving ring 15 having an ondulated internal cam face 16. The tubular member 1 is rotated during said hammering operation.

Figure 8:
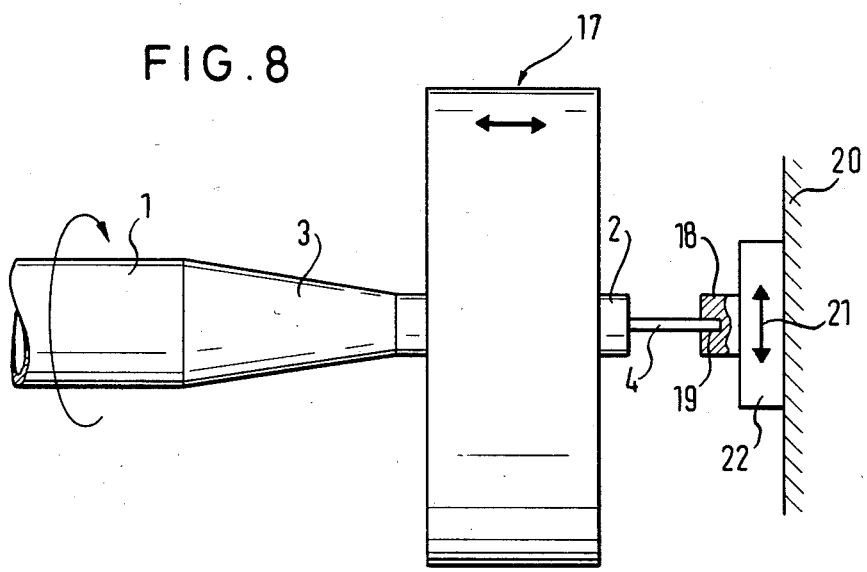
FIG. 8 shows an arrangement for inserting a pin shaped closure member into said tubular member.

In FIG. 8 the hammering tool is diagrammatically indicated by 17. A pin inserting member is designated by 18. This pin inserting member 18 is provided with a bore 19 receiving the cylinder pin 4 by slight frictional engagement. The pin inserting member is movable with respect to a support member 20 both in the direction of arrow 21 and also in a direction perpendicular to the plane of the drawing. This may be achieved by the pin inserting member being part of a magnetic body 22 which adheres to the supporting member 20 made of iron. So the pin 4 can be inserted into the tubular member 1 already before the reduction in diameter begins or at least before the reduction in diameter is completed. The positioning of the pin 4 with respect to the axis of the section 2 is accomplished by the movement of the magnetic body 22 with respect to the support member 20. The end of the pin 4 extending beyond the section 2 of the tubular member 1 may be cut after the hammering operation has been terminated.

Figure 9:
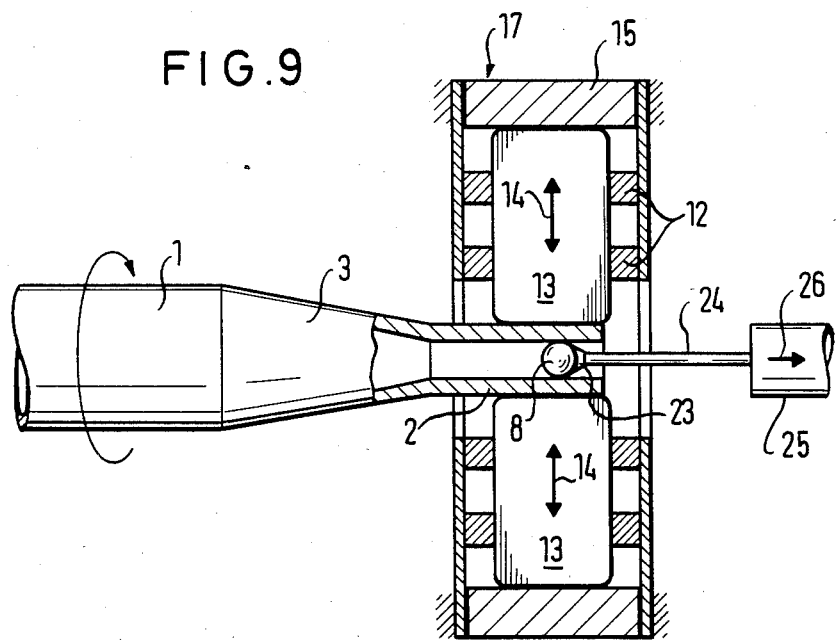
FIG. 9 shows an arrangement for inserting a ball-shaped closure member into said tubular member and FIG. 10 shows a piston rod of this invention as a component of a cylinder piston device.

In FIG. 9 there is shown an arrangement for inserting a ball-shaped member 8. The ball 8 is fixed on a spherical socket 23 of an inserting needle 24 which needle 24 is fastened to a reciprocating carrier member 25. The ball 8 may be fixed in the socket 23 by magnetic action or by suction. The diameter of the socket 23 is smaller than the diameter of the ball 8, so as to allow self-alignment of the ball with the axis of the section 2 being reduced in diameter. After the ball 8 has been gripped by the reduction of internal diameter in the section 2, the carrier member 25 is moved in the direction of the arrow 26 such as to separate the needle 24 from the ball 8.

Figure 10:
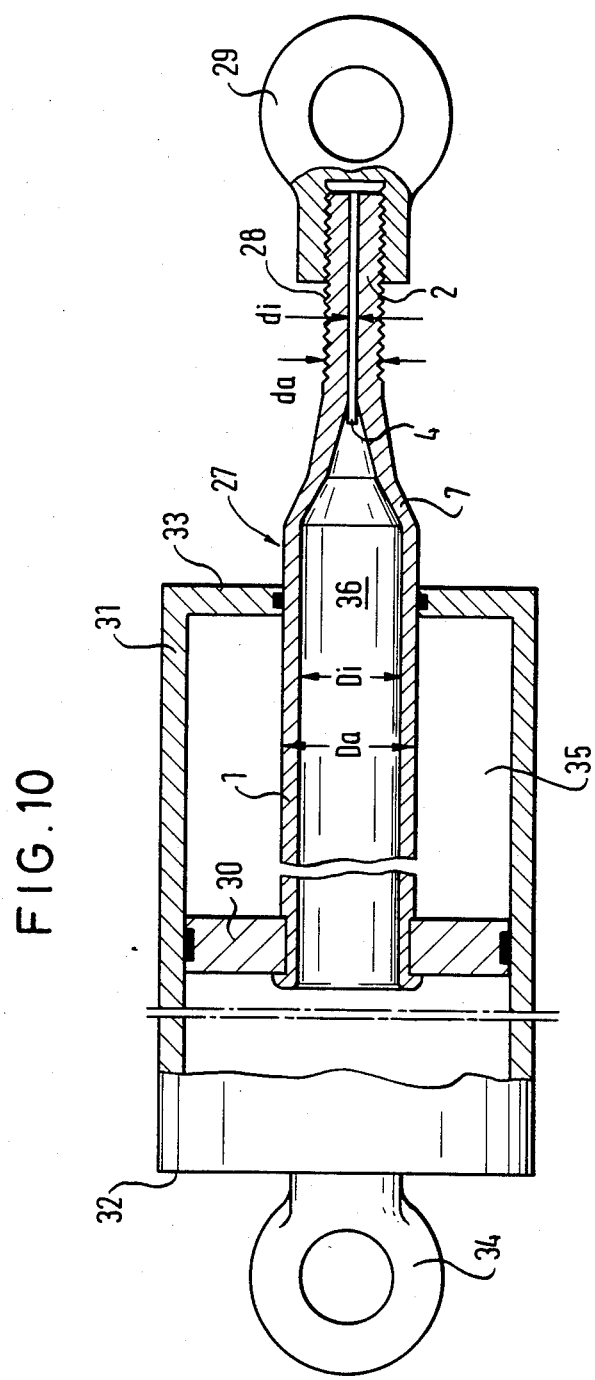

In FIG. 10 there is shown a completed piston rod 27 manufactured in accordance with this invention. The right-hand part of the piston rod corresponds to the embodiment of FIG. 4. The section 2 is threaded as shown at 28 and a link member 29 is screwed onto the thread 28. The left-hand end of the tubular member 1 is fixed to a piston member 30. The piston member 30 is housed within a cylinder 31 having a closed end wall at 32 and an annular guiding and sealing member 33 through which the piston rod 27 passes. A further link member 34 is fixed to the end wall 32. It is to be noted that the cavity 35 within the cylinder 31 is in fluid connection with the cavity 36 within the piston rod 27. The cavity 36 is closed by the cylindrical pin 4 in a gas-tight manner.

The basic outer diameter of the tubular member 1 is designated by $D_a$ and the basic inner diameter is designated by $D_i$. The final diameter of the section 2 after the hammering operation is designated by $d_a$ and the final inner diameter of the section 2 corresponding to the external diameter of the pin 4 is designated by $d_i$. As a matter of example, the diameter $D_a$ is 18–25 mm and the diameter $D_i$ is 13–17 mm, the smaller values of $D_i$ corresponding to the smaller values of $D_a$. The hammering operation is such that the final diameter $d_a$ is 9–14 mm, the smaller values corresponding again to the smaller values of $D_a$ and $D_i$.

The tubular member may be made of steel St 52 or C 35.

Although the invention has been described as illustrated herein by reference to specific embodiments thereof, it will be understood that many modifications and variations of such embodiments may be made without departing from the inventive concepts disclosed.

The reference numerals are only for an easier understanding. They are not to be understood in a restrictive sense.

We claim:

1. In a method for making a metal piston rod for a piston and cylinder assembly particularly in a shock absorber device for motor vehicles including a cylinder member having a piston member slidable movable in sealed engagement therein with said piston rod affixed to said piston member and extending outwardly from said cylinder member with one end thereof, said piston rod comprising a tubular configuration having a circular cross-section defining a hollow interior exposed at an end opposite said one end to the interior of said cylinder member, a tubular extension at said one end adapted to be fastened to an associated structural member externally of said cylinder member and a closure member having a circular cross-section provided within said tubular extension in sealing interference engagement therein sealing said hollow interior of said piston rod at said opposite end, the improvement comprising the steps of providing a closure member made of steel and having a smooth outer surface at least along the portion thereof provided within said tubular extension and deforming said tubular extension, and shaping it into a reduced diameter thickened wall portion of said piston rod around said closure member while said closure member is inserted within said hollow interior thereby to place said closure member into sealing interference engagement within said reduced diameter portion of said piston rod, said reduced diameter tubular extension being formed with a diameter which is uniform about and substantially along the axis of said tubular extension, and securing a structural member to the exterior of said thickened wall tubular extension, said closure member being the only surface treatment member acting on the inner surface of said tubular extension during said deformation, said inner surface being smoothed by said closure member.

2. A method according to claim 1, wherein said closure member is provided in the form of a cylindrical pin.

3. A method according to claim 2, wherein said extension of reduced diameter is formed to comprise a terminal section of substantially constant diameter, said cylindrical pin being located to extend within said terminal section along about the total length of said terminal section.

4. A method according to claim 2, wherein said cylindrical pin is provided with a thickened head at the inwardly end thereof.

5. A method according to claim 4, wherein said thickened head of said cylindrical pin is formed in a conical configuration.

6. A method according to claim 4, wherein said thickened head is positioned in a transition section of decreasing diameter adjacent a terminal section of substantially constant diameter of said extension.

7. A method according to claim 1, wherein said closure member is provided in the form of a ball member.

8. A method according to claim 1, wherein said closure member is provided with sealing means on its external surface.

9. In a method for making a metal piston rod for a piston and cylinder assembly particularly in a shock absorber device for motor vehicles including a cylinder member having a piston member slidably movable in sealed engagement therein with said piston rod affixed to said piston member and extending outwardly from said cylinder member with one end thereof, said piston rod comprising a tubular configuration having a circular cross-section defining a hollow interior exposed at an end opposite said one end to the interior of said cylinder member, a tubular extension at said one end adapted to be fastened to an associated structural member externally of said cylinder member and a closure member having a circular cross-section provided within said tubular extension in sealing interference engagement therein sealing said hollow exterior of said piston rod at said opposite end, the improvement comprising the steps of providing a closure member made of plastic and having a smooth outer surface at least along the portion thereof provided within said tubular extension, deforming said tubular extension and shaping it into a reduced diameter thickened wall portion of said piston rod around said closure member while said closure member is inserted within said hollow interior thereby to place said closure member into sealing interference engagement within said reduced diameter portion of said piston rod, said reduced diameter tubular extension being formed with a diameter which is uniform about and substantially along the axis of said tubular extension and securing a structural member to the exterior of said thickened wall tubular extension.

* * * * *